(12) United States Patent
Pedersen

(10) Patent No.: US 11,097,225 B1
(45) Date of Patent: Aug. 24, 2021

(54) METHODS TO MINIMIZE SCALING IN WATER FILTRATION SYSTEMS

(71) Applicant: Aqua Tru LLC, Sherman Oaks, CA (US)

(72) Inventor: Michael A. Pedersen, Sherman Oaks, CA (US)

(73) Assignee: Aqua Tru LLC, Sherman Oaks, CA (US)

( * ) Notice: Subject to any disclaimer, the term of this patent is extended or adjusted under 35 U.S.C. 154(b) by 2 days.

(21) Appl. No.: 16/842,845

(22) Filed: Apr. 8, 2020

(51) Int. Cl.
*B01D 65/08* (2006.01)
*C02F 1/44* (2006.01)
*B01D 65/02* (2006.01)

(52) U.S. Cl.
CPC .......... *B01D 65/08* (2013.01); *B01D 65/027* (2013.01); *C02F 1/441* (2013.01); *C02F 2201/005* (2013.01); *C02F 2303/22* (2013.01)

(58) Field of Classification Search
CPC ............ B01D 2321/02; B01D 2321/10; B01D 2321/16–168; B01D 61/12; B01D 61/025; B01D 65/08; B01D 65/027; C02F 2303/22; C02F 1/008; C02F 1/441; C02F 2201/005
See application file for complete search history.

(56) References Cited

U.S. PATENT DOCUMENTS

| | | | |
|---|---|---|---|
| 9,517,958 B2 * | 12/2016 | Spiegel | C02F 9/005 |
| 2008/0290046 A1 | 11/2008 | King et al. | |
| 2013/0043190 A1 | 2/2013 | Al-Samadi | |
| 2015/0090645 A1 | 4/2015 | Black et al. | |
| 2016/0279545 A1 | 9/2016 | Bippus et al. | |
| 2016/0354727 A1 * | 12/2016 | Denvir | B01D 61/147 |
| 2017/0137303 A1 * | 5/2017 | Hirsch | C02F 1/001 |
| 2018/0265379 A1 | 9/2018 | Xue et al. | |

\* cited by examiner

*Primary Examiner* — Terry K Cecil
(74) *Attorney, Agent, or Firm* — Eversheds Sutherland (US) LLP

(57) ABSTRACT

A method for water filtration to reduce scaling is disclosed herein. The method includes determining that a pump has been inactive for a threshold period of time. The method also includes closing a first valve to a filtered drinking water tank and opening a second valve to a source water tank based on determining that the pump has been inactive for the threshold period of time. The method further includes activating, based on the first valve being closed and the second valve being opened, the pump for a period of time to circulate water from the source water tank through a filter system and back to the source water tank.

20 Claims, 2 Drawing Sheets

METHODS TO MINIMIZE SCALING IN WATER FILTRATION SYSTEMS

BACKGROUND

Due to increased levels of toxicity caused by chemicals found within the water supply, water filtration has become widespread within many homes. Point-of-use (POU) water treatment devices are designed to treat small amounts of drinking water for use in the home. These devices can sit on the counter, attach to the faucet, or be installed under the sink. They differ from point-of-entry (POE) devices, which are installed on the water line as it enters the home and treats all the water in the building.

Many households today have Reverse-Osmosis (RO) units installed. Reverse-osmosis devices are usually installed underneath the sink, with the tap water connection plumbed directly to the sink cold water supply line, and a waste water drain line connected directly to the sink p-trap. These devices use a membrane that screens out chemicals, such as chloride and sulfate as well as most other contaminates found in the water supply today. A RO system can remove particles down to 1 Angstrom. However POU RO systems can waste as much as 3 to 4 gallons of water for every gallon that is treated. This is due to a continuous flow of water that is required across the membrane surface to remove contamination and to keep the membrane from clogging up.

In addition, if the POU RO systems are not properly maintained, scaling can occur. Scaling takes place when water has high levels of minerals like calcium carbonate, which can build-up on surfaces and within the filters.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
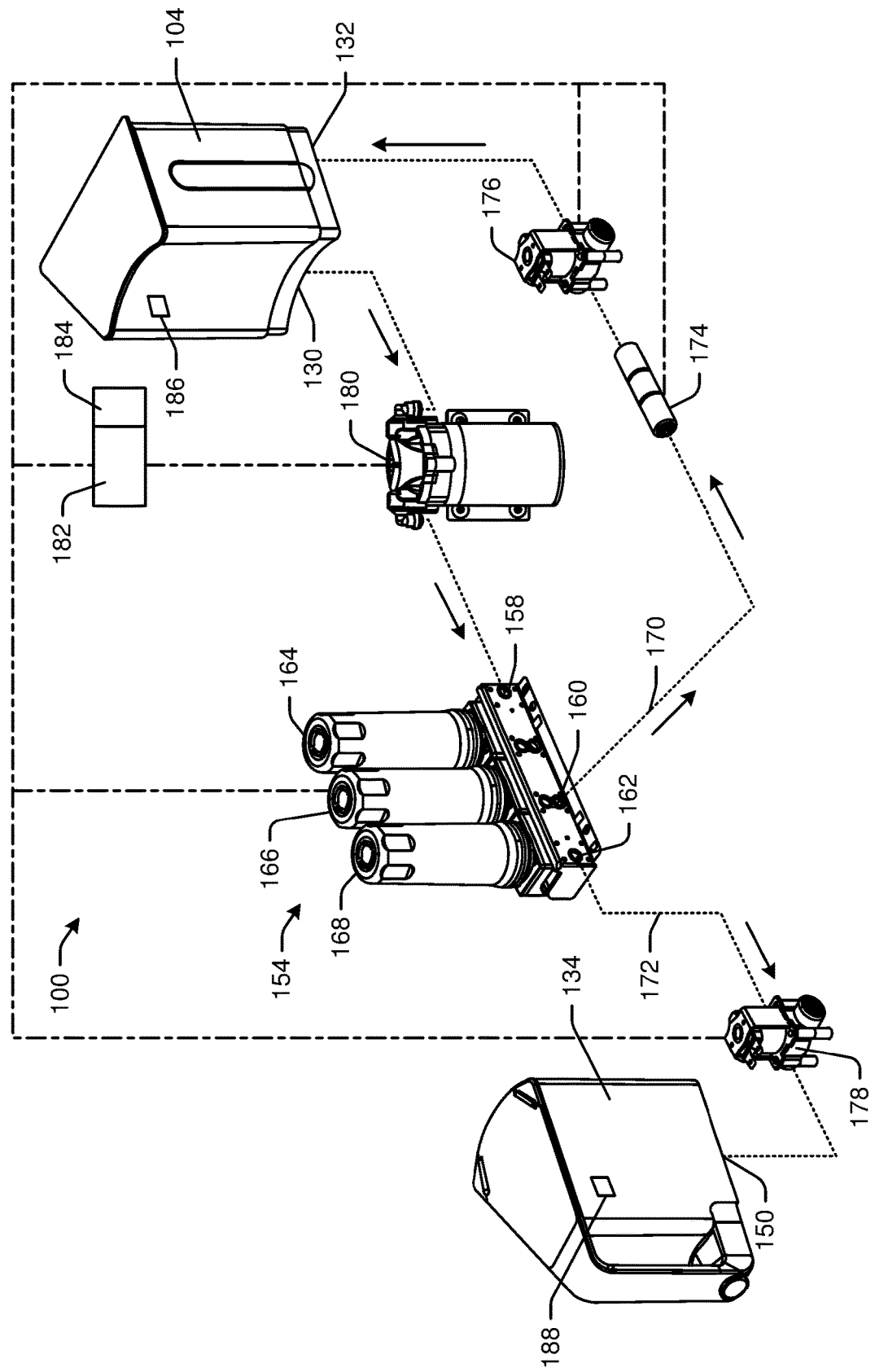
FIG. 1 schematically depicts a water filtration system in accordance with one or more embodiments of the disclosure.

FIG. 1 schematically depict a water filtration system 100 (as well as individual components of the water filtration system 100) in accordance with one or more embodiments of the disclosure. In some instances, the water filtration system 100 may comprise a countertop reverse osmosis water filtration system. That is, the water filtration system 100 may be sized and shaped to fit on a countertop and/or within a refrigerator. The water filtration system 100 may be any suitable size and shape. The water filtration system 100 may work independent from any water source and/or drain. That is, the water filtration system 100 may have no external connections. Moreover, the water filtration system 100 may produce little to no waste water. One example countertop water filtration system is disclosed in U.S. Pat. No. 9,517,958.

As depicted in FIG. 1, the water filtration system 100 may include a first receptacle 104, which may be detachably disposed on a support base or the like. The first receptacle 104 may be configured to store source water therein. For example, a user may pour water (e.g. tap water) into the first receptacle 104, or a user may remove the first receptacle 104 from the support base 102 and fill it with water (e.g., tap water). The first receptacle 104 may include an outlet port 130 and an inlet port 132. In some instances, water may exit the first receptacle 104 through the outlet port 130. Water also may enter the first receptacle 104 by way of the inlet port 132.

The water filtration system 100 may include a second receptacle 134. The second receptacle 134 may be detachably disposed on the support base. The second receptacle 134 may be configured to store supply water (e.g., filtered drinking water) therein. The second receptacle 134 may include an inlet port 150.

The water filtration system 100 may include a filter system 154. The filter system 154 may include an inlet port 158, a first outlet port 160, and a second outlet port 162. In some instances, when the first receptacle 104 and the second receptacle 134 are attached to the support base, the outlet port 130 of the first receptacle 104 may be disposed in fluid communication with the inlet port 158 of the filter system 154. Moreover, the first outlet port 160 of the filter system 154 may be disposed in fluid communication with the inlet port 132 of the first receptacle 104. In addition, the second outlet port 162 of the filter system 154 may be disposed in fluid communication with the inlet port 150 of the second receptacle 134.

In certain embodiments, the filter system 154 may include a first filter 164, a second filter 166, and a third filter 168. Additional or fewer filters may be used. The first filter 164 may be configured and disposed to receive water from the inlet port 158 of the filter system 154 and to filter and deliver first filtered water to the second filter 166. In some instances, the first filter 164 may be a sediment filter or a combination of a sediment filter and a carbon filter. The first filter 164 may comprise any suitable filter. In some instances, additional filters may be disposed upstream of the first filter 164.

The second filter 166 may be configured and disposed to receive the first filtered water from the first filter 164 and to deliver a first portion of the first filtered water to the first outlet port 160 of the filter system 154. In this manner, the first portion of the first filtered water may comprise waste water 170 that is delivered back to the first receptacle 104. Moreover, the second filter 166 may be configured to filter and deliver a second portion of the first filtered water to the third filter 168. The second portion of the first filtered water may comprise second filtered water. In some instances, the second filter 166 may be a reverse osmosis membrane type filter. The second filter 166 may be any suitable filter.

The third filter 168 may be configured and disposed to receive the second filtered water from the second filter 166 and to filter and deliver third filtered water to the second outlet port 162 of the filter system 154. In this manner, the third filtered water may comprise the supply water 172 that is delivered to the second receptacle 134. In some instances, the third filter 168 may be a carbon filter. The third filter 168 may be any suitable filter. In other instances, the third filter 168 may be omitted. In such instances, the second filter 166 may be configured to filter and deliver the second portion of the first filtered water to the second receptacle 134. In yet other instances, additional filters may be disposed downstream of the third filter 168 before the second receptacle 134.

In certain embodiments, about 100% of the water that enters the first filter 164 may pass to the second filter 166. In another embodiment, less than 100% of the water that enters the second filter 166 may pass to the third filter 168. For example, about 1% to about 30% of the water that enters the second filter 166 may pass to the third filter 168, with the remaining water constituting the waste water 170 that is delivered back to the first receptacle 104. In yet another embodiment, about 100% of the water that enters the third filter 168 may pass to the second receptacle 134. This process is repeated as needed.

The water filtration system 100 may include a flow restrictor 174. The flow restrictor 174 may be disposed between and in fluid communication with the first outlet port 160 of the filter system 154 and the inlet port 132 of the first receptacle 104. The flow restrictor 174 may be configured to create a back pressure in the second filter 166 (e.g., on the reverse osmosis membrane). The back pressure may enable the second portion of the first filtered water to pass through the reverse osmosis membrane to produce the second filtered water. Moreover, a return check valve 176 may be disposed between and in fluid communication with the flow restrictor 174 and the inlet port 132 of the first receptacle 104. The return check valve 176 may be configured to prevent water flow from the first receptacle 104 to the filter system 154.

In certain embodiments, a forward check valve 178 may be disposed between and in fluid communication with the second outlet port 162 of the filter system 154 and the inlet port 150 of the second receptacle 134. The forward check valve 178 may be configured to prevent water flow from the second receptacle 134 to the filter system 154.

The water filtration system 100 may include a pump 180 disposed between and in fluid communication with the outlet port 130 of the first receptacle 104 and the inlet port 158 of the filter system 154. In some instances, the pump 180 may be automatically primed by the fluid flow from the outlet port 130 of the first receptacle 104. For example, the water supplied to the pump 180 may be gravity fed from the outlet port 130 of the first receptacle 104. The pump 180 may be the sole source for generating hydraulic pressure that facilitates fluid flow from the first receptacle 104 through the filter system 154 to the second receptacle 134. In some instances, the pump 180 may facilitate fluid flow from the first receptacle 104 through only a portion of the filter system 154 and back to the first receptacle 104 via the flow restrictor 174.

In certain embodiment, the water filtration system 100 may include a supply of electrical power 182, an electronic controller 184, a first sensor 186 disposed and configured to sense a water level in the first receptacle 104, and a second sensor 188 disposed and configured to sense a water level in the second receptacle 134. The electronic controller 184 may be disposed in signal communication with the supply of electrical power 182, the first sensor 186, the second sensor 188, and the pump 180. In some instances, the electrical controller 184 may be configured to sense, via the first sensor 186, a water level in the first receptacle 104 sufficient enough to enable activation of the pump 180. The electrical controller 184 also may be configured to sense, via the second sensor 188, a water level in the second receptacle 134 deficient enough to enable activation of the pump 180. Moreover, the electrical controller 184 may be configured to activate or deactivate the pump 180 in accordance with the respective water levels in the first receptacle 104 and the second receptacle 134. In other instances, the electric power 182 and/or the electrical controller 184 may be in communication with one or more of the filter system 154, the flow restrictor 174, the return check valve 176, and/or the forward check valve 178.

The supply of electrical power 182 may include an electrical cord connectable to an alternating current (AC) line voltage. In some instances, the AC line voltage may be 120 VAC. In other instances, the supply of electrical power 182 may include at least one direct current (DC) battery. The at least one DC battery may be configured to provide 12 VDC or 24 VDC. The supply of electrical power 182 may include an electrical input port configured to receive a DC voltage.

Figure 2:
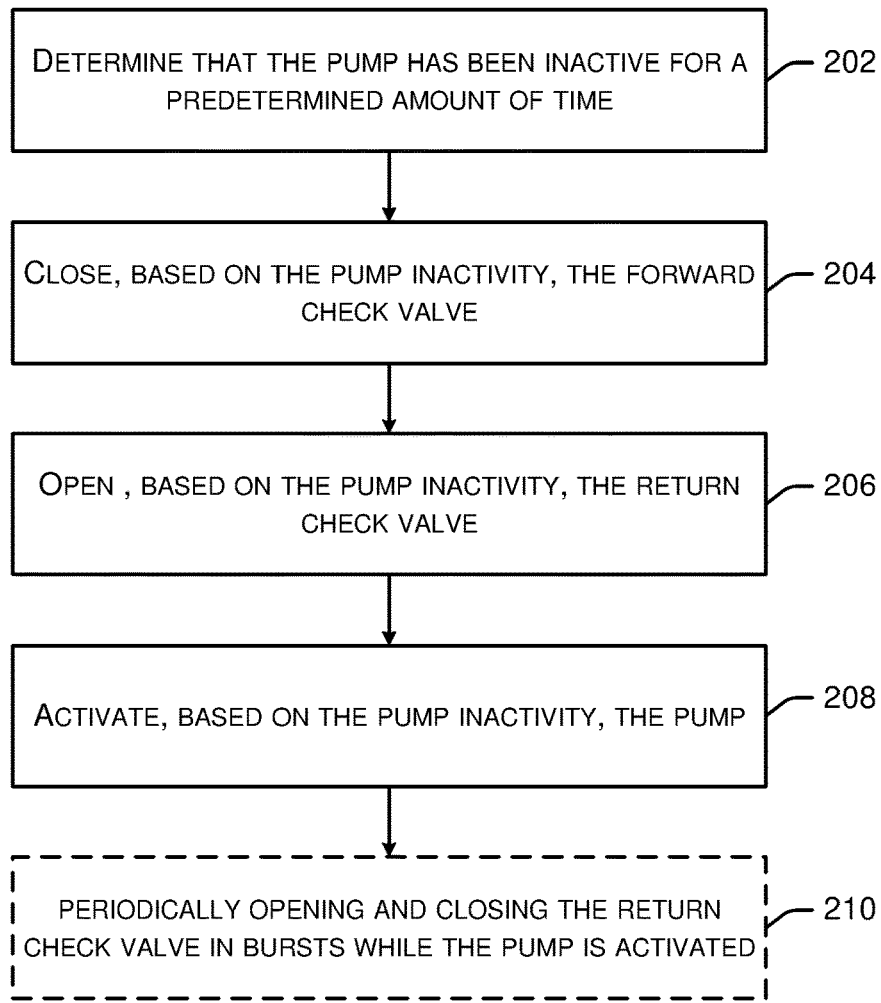
FIG. 2 is a flow diagram depicting an illustrative method for filtering water in accordance with one or more embodiments of the disclosure.

FIG. 2 depicts a flow diagram depicting an illustrative method 200 for filtering water in accordance with one or more embodiments of the disclosure. The method 200 may be implemented by one or more controllers, for example, the electronic controller 184 or the like.

The method 200 may facilitate the reduction of scaling in the water filtration system 100. At block 202, the method may determine that the pump 180 has been inactive for a threshold period of time. In some instances, the threshold period of time is about 60 minutes. The threshold period of time may be any suitable time. For example, the threshold period of time may be 1, 2, 5, 10, 15, 20, 30, 60, and/or 120 minutes or any suitable time there between. In other instances, the threshold period of time may be half a day, once a day, once a week, once a month and the like. Once it is determined that the pump 180 has been inactive for the threshold period of time, the method 200 may include closing the forward check valve 178 to the filtered drinking water tank 134 at step 204. Similarly, at step 206, the method 200 may include opening, based on determining that the pump 180 has been inactive for the threshold period of time, the return check valve 176 to the source water tank 104.

At step 208, once the forward check valve 178 is closed or determined to already be closed and the return check valve 176 is opened or determined to already be open, the pump 180 may be activated for a period of time to circulate water from the source water tank 104 through the filter system 154 and back to the source water tank 104. In some instances, the period of time is about 2 minutes. The period of time may be any suitable time. For example, the period of time may be 1, 2, 5, 10, 15, 20, 30, 60, and/or 120 seconds or any suitable time there between. In other instances, the period of time may be 1, 2, 5, 10, 15, 20, 30, 60, and/or 120 minutes or any suitable time there between.

In some instances, the pump 180 may be activated in bursts to create changes in pressure and water flow within at least portions of the loop formed by the pump 180, the filter system 154, and the source water tank 104. In some instances, the pump 180 may be activated and deactivated in equally timed and spaced increments. In other instances, the time between activating and deactivating the pump 180 may vary. For example, the pump 180 may be periodically activated and deactivated in bursts in progressively shorter increments between the bursts. Each burst may be the same or vary. That is, alternatively, the pump 180 may be periodically opened and closed in bursts of varying duration in progressively shorter or longer increments between the bursts. In some instances, the pump 180 may be periodically opened and closed in bursts in progressively shorter increments between bursts at first and then in progressively longer increments between bursts thereafter, or vice versa.

In one example embodiment, after every 60 minutes of pump 180 inactivity, the pump 180 may be turned on for 2 minutes, with the forward check valve 178 closed and the return check valve 176 open. This configuration may enable the system 100 to flush water from the source water tank 104, through the pump 180 and the RO membrane of the filter system 154, and back into the source water tank 104, which may result in agitating the water to make it harder for calcium to grow and create scaling on the various filters of the filter system 154 and within the pump 180, as well as within the internal surfaces of the piping connecting all of these components in a closed loop.

In certain embodiments, it may be determined via the first sensor 186 that the source water tank 104 is empty or below a threshold level of water. In such instances, the method 200 may end. That is, if the source water tank 104 is determined to be empty or to contain an amount of water below a threshold, the method 200 to facilitate the reduction of scaling in the water filtration system 100 may not be initiated or abandoned if already in progress.

At step 210, in some instances, the method 200 may include periodically opening and closing the return check valve 176 in bursts while the pump 180 is activated to create changes in pressure and water flow within at least portions of the loop formed by the pump 180, the filter system 154, and the source water tank 104. In some instances, the return check valve 176 may be opened and closed in equally timed and spaced increments. In other instances, the time the return check valve 176 is opened and the time between opening and closing the return check valve 176 may vary. For example, the return check valve 176 may be periodically opened and closed in bursts in progressively shorter increments between the bursts. Each burst may be the same or vary. That is, alternatively, the return check valve 176 may be periodically opened and closed in bursts of varying duration in progressively shorter or longer increments between the bursts. In some instances, the return check valve 176 may be periodically opened and closed in bursts in progressively shorter increments between bursts at first and then in progressively longer increments between bursts thereafter, or vice versa.

In one example embodiment, after every 60 minutes of pump 180 inactivity, the pump 180 may be turned on for 2 minutes, with the forward check valve 178 closed and the return check valve 176 open. During the 2 minutes of pump 180 activity, the return check valve 176 may be closed for a brief moment to create pressure and water flow variations. In some instances, the return check valve 176 may sporadically open and close to create the pressure and water flow variations to make it harder for calcium to grow and create scaling on the various filters of the filter system 154 and within the pump 180, as well as within the internal surfaces of the piping connecting all of these components in a closed loop. For example, one example sequence for opening and closing the return check valve 176 may include opening the return check valve 176 for 30 second, closing it for 3 second, opening it for 27 seconds, closing it for 3 seconds, opening it for 2 seconds, closing it for 3 seconds, opening it for 2 seconds, closing it for 3 seconds, and opening it for 47 seconds. Such a sequence may flush water from the source water tank 104, through the pump 180 and the RO membrane of the filter system 154, and back into the source water tank 104, which may result in agitating the water to make it harder for calcium to grow and create scaling on the various filters of the filter system 154 and within the pump 180, as well as within the internal surfaces of the piping connecting all of these components in a closed loop. More so, the opening and closing the return check valve 176 may create a water hammer (rapid changes in water flow), which may shear calcium scale from the various surfaces.

Although the return check valve 176 is disclosed as being periodically opened and closed in bursts, the forward check valve 178 may also be periodically opened and closed in bursts in a similar manner as described above with reference to the return check valve 176.

In certain embodiments, the steps described in blocks 202-210 of method 200 may be performed in any order. The steps described in blocks 202-210 of method 200 are but one example of several embodiments. For example, certain steps may be omitted, while other steps may be added.

In another embodiment, the return check valve 176 may be omitted. In such instances, once the forward check valve 178 is closed or determined to already be closed, the pump 180 may be activated and/or deactivated (e.g., in bursts) as discussed above for a period of time to circulate water from the source water tank 104 through the filter system 154 and back to the source water tank 104.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method to reduce scaling in a water filtration system, the method comprising:
    determining that a pump has been inactive for a threshold period of time;
    determining, based on determining that the pump has been inactive for the threshold period of time, that a first valve to a filtered drinking water tank is closed;
    determining, based on determining that the pump has been inactive for the threshold period of time, that a second valve to a source water tank is open; and
    activating, based on the first valve being closed and the second valve being opened, the pump for a period of time to circulate water from the source water tank through a filter system and back to the source water tank.

2. The method of claim 1, further comprising periodically opening and closing the second valve in bursts while the pump is activated to create changes in pressure and water flow within at least portions of a loop formed by the pump, the filter system, and the source water tank.

3. The method of claim 2, wherein periodically opening and closing the second valve in bursts comprises opening and closing the second valve in progressively shorter increments.

4. The method of claim 1, wherein the threshold period of time is greater than 60 minutes.

5. The method of claim 1, wherein the period of time to circulate water from the source water tank through the filter system and back to the source water tank is about 2 minutes.

6. The method of claim 1, wherein the first valve comprises a forward check valve.

7. The method of claim 1, wherein the second valve comprises a return check valve.

8. A water filtration system, comprising:
  a controller configured to:
    determine that a pump has been inactive for a threshold period of time;
    close, based on determining that the pump has been inactive for the threshold period of time, a first valve to a filtered drinking water tank;
    open, based on determining that the pump has been inactive for the threshold period of time, a second valve to a source water tank; and
    activate, based on the first valve being closed and the second valve being opened, the pump for a period of time to circulate water from the source water tank through a filter system and back to the source water tank.

9. The system of claim 8, further comprising periodically opening and closing the second valve in bursts while the pump is activated to create changes in pressure and water flow within at least portions of a loop formed by the pump, the filter system, and the source water tank.

10. The system of claim 9, wherein periodically opening and closing the second valve in bursts comprises opening and closing the second valve in progressively shorter increments.

11. The system of claim 8, wherein the threshold period of time is about 60 minutes.

12. The system of claim 8, wherein the period of time to circulate water from the source water tank through the filter system and back to the source water tank is about 2 minutes.

13. The system of claim 8, wherein the first valve comprises a forward check valve.

14. The system of claim 8, wherein the second valve comprises a return check valve.

15. A method to reduce scaling in water filtration system, the method comprising:
  determining that a pump has been inactive for a threshold period of time;
  determining, based on determining that the pump has been inactive for the threshold period of time, that a first valve to a filtered drinking water tank is closed;
  activating, based on the first valve being closed, the pump for a period of time to circulate water from a source water tank through a filter system and back to the source water tank.

16. The method of claim 15, wherein the pump is periodically activated and deactivated in bursts.

17. The method of claim 16, wherein periodically activating and deactivating the pump in bursts comprises activating and deactivating the pump in progressively shorter increments.

18. The method of claim 15, wherein the threshold period of time is greater than 60 minutes.

19. The method of claim 15, wherein the period of time to circulate water from the source water tank through the filter system and back to the source water tank is about 2 minutes.

20. The method of claim 15, wherein the first valve comprises a forward check valve.

* * * * *